UNITED STATES PATENT OFFICE.

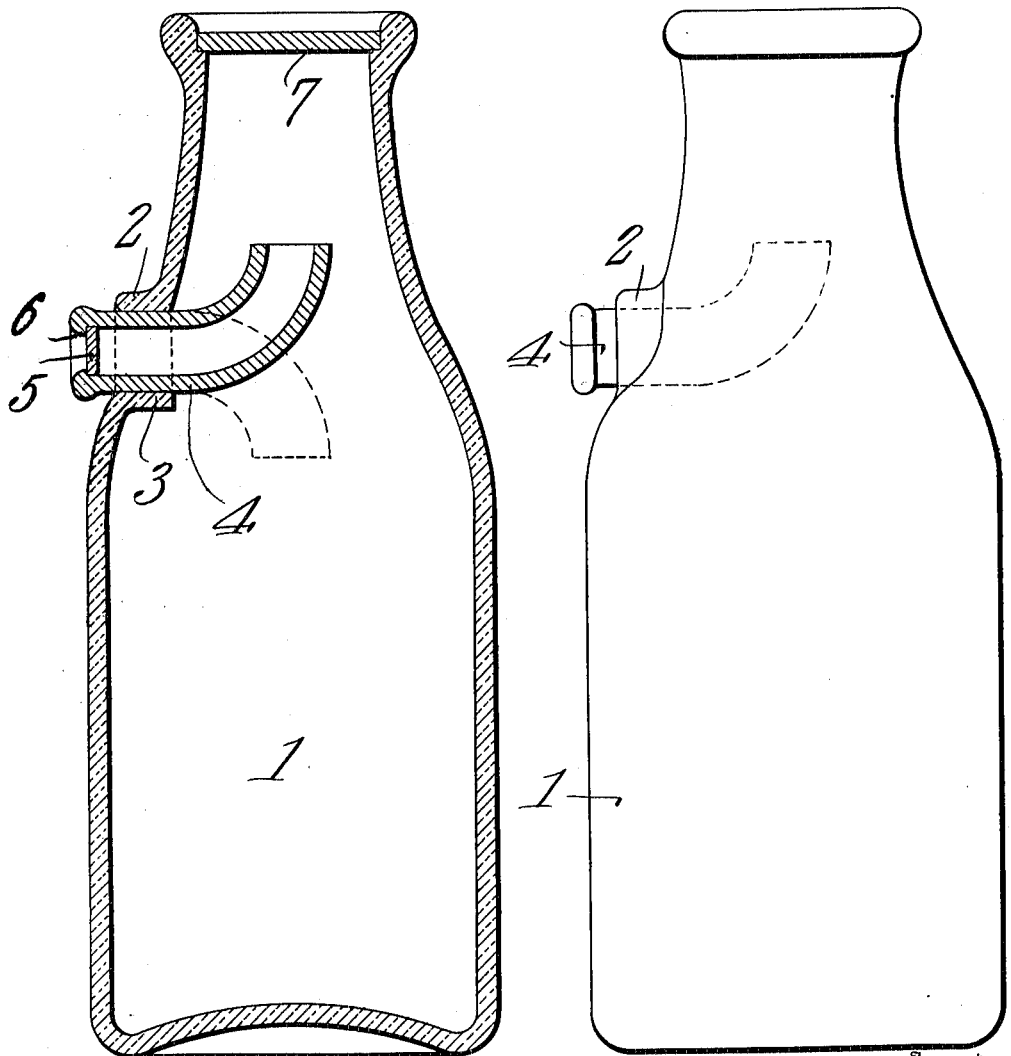

ADA B. BROWN, OF SEATTLE, WASHINGTON.

CREAM-SEPARATOR.

999,747.  Specification of Letters Patent.  Patented Aug. 8, 1911.

Application filed February 9, 1910. Serial No. 542,916.

*To all whom it may concern:*

Be it known that I, ADA B. BROWN, a citizen of the United States, residing at Seattle, in the county of King and State of Washington, have invented a new and useful Cream-Separator, of which the following is a specification.

This invention relates to cream separators and its object is to provide a device of this character in the form of a milk bottle or receptacle having means whereby the cream accumulating in the upper portion of the bottle or receptacle, can be drained therefrom without disturbing the milk.

Another object is to provide a drain device which can be adjusted so as to carry off any one of three different grades of cream contained within the receptacle.

A still further object is to provide a device of this character which is simple in construction and can be readily manipulated.

With these and other objects in view the invention consists of certain novel details of construction and combinations of parts hereinafter more fully described and pointed out in the claims.

In the accompanying drawings the preferred form of the invention has been shown.

In said drawings, Figure 1 is an elevation of a bottle having the separating tube in position therein. Fig. 2 is a vertical section through the parts shown in Fig. 1, one of the positions of the tube being shown by dotted lines.

Referring to the figures by characters of reference 1 designates a bottle or other receptacle formed of glass, paper, or any other suitable material, although in the present instance the same has been shown in the form of an ordinary milk bottle. The said bottle has a boss or thickened portion 2 adjacent the base of the neck and an opening 3 extends through this thickened portion and has a tube 4 fitted snugly therein, the inner portion of the tube being curved while the outer portion thereof is designed to be closed by means of a cap formed of paper, cork or any other suitable material and held in place by a retaining shoulder or rib 6, constituting a knob whereby the tube can be readily grasped and turned within the opening 3. This tube 4 can be made of glass, paper or other desired material and it is so located and proportioned that, when the receptacle 1 is filled with unskimmed milk, the inner end of the tube can be turned upward into the thickest portion of the cream contained in the upper portion of the receptacle. After the tube has thus been arranged, the cap 5 can be removed from or pressed back into the tube so as to open the outlet end of the tube after which the closure 7 of the receptacle can be taken off. The contents of the receptacle would therefore drain outward through the tube 4 until the level of such contents drops to the end of the tube. It will be apparent therefore that the best grade of cream contained within the receptacle can thus be withdrawn without disturbing the remainder of the liquid contents. Should it be desired to remove a greater quantity of cream from the receptacle, the tube 4 can first be turned until its curved end portion is extended toward the wall of the bottle whereupon the contents of said bottle or receptacle can be withdrawn until the level thereof falls to the bottom of the opening within the tube. By turning the tube downwardly as shown by dotted lines in Fig. 2, the liquid can be drained off to a still lower level and practically all of the cream contained in the receptacle can thus be removed although, of course, the quality of the cream thus removed will not be of as high a grade as where only the uppermost portion of the cream is removed as in the first instance herein mentioned.

It is to be understood that the drain tube herein described can be discarded after the bottle has been once used, the said tubes being made of an inexpensive material and being inserted into the bottles prior to each filling thereof.

While the bottle is being transported, or while it is being filled prior to transportation, the tube 4 may be pushed longitudinally into the bottle so as to bring its outlet end against the bottle neck and within the circle occupied by the body of the bottle. There is therefore little danger of the outer end of the tube becoming broken while the bottle is being handled. When it is desired to use the tube for draining off the cream, however, the discharge end of the tube can be pulled outwardly a sufficient distance to permit a cup or other receptacle to be placed thereunder so as to allow the cream to fall directly thereinto.

It is of course to be understood that various changes may be made in the construction and arrangement of the parts without departing from the spirit or sacrificing any of the advantages of the invention as defined in the appended claims.

What is claimed is:—

1. A bottle having a neck portion and an enlargement upon the neck portion provided with an outlet opening, a drain tube slidable longitudinally within said opening, the outer end of said tube being normally within the bounds outlined by the body of the bottle, and an enlargement upon the outer end portion of the tube and constituting a combined stop and knob, said tube being shiftable longitudinally by means of the knob to project its outer end beyond said bounds.

2. A bottle having a reduced neck portion provided with an enlargement, there being an opening within the enlargement, a drain tube having a straight portion slidable longitudinally and revoluble within said opening, the outer end of the tube being normally within the bounds outlined by the body of the bottle, there being an enlargement upon the outer end portion of the tube and constituting a combined stop and knob, the inner end portion of the tube being curved and the free end thereof being shiftable to different elevations by the rotation of the tube, said tube being movable longitudinally to project its outer end beyond the body of the bottle.

In testimony that I claim the foregoing as my own, I have hereto affixed my signature in the presence of two witnesses.

ADA B. BROWN.

Witnesses:
B. W. Pettit,
G. F. Clark.